United States Patent
Chapdelaine

(10) Patent No.: US 12,325,514 B2
(45) Date of Patent: Jun. 10, 2025

(54) LED TAIL ROTOR SAFETY AND STATUS INDICATION LIGHTING SYSTEM

(71) Applicant: Textron Innovations Inc., Providence, RI (US)

(72) Inventor: Mathew Chapdelaine, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 119 days.

(21) Appl. No.: 18/193,217

(22) Filed: Mar. 30, 2023

(65) Prior Publication Data
US 2024/0034464 A1 Feb. 1, 2024

Related U.S. Application Data

(63) Continuation-in-part of application No. 17/873,983, filed on Jul. 26, 2022.

(51) Int. Cl.
*B64C 27/00* (2006.01)
*B64C 27/82* (2006.01)
*B64D 47/06* (2006.01)

(52) U.S. Cl.
CPC ............ *B64C 27/006* (2013.01); *B64C 27/82* (2013.01); *B64D 47/06* (2013.01); *B64C 2027/8281* (2013.01); *B64C 2027/829* (2013.01); *B64D 2203/00* (2013.01)

(58) Field of Classification Search
CPC .... B64C 27/006; B64D 2203/00; B64D 47/06
See application file for complete search history.

(56) References Cited

U.S. PATENT DOCUMENTS

| | | | | |
|---|---|---|---|---|
| 3,241,791 A | * | 3/1966 | Piasecki | B64C 27/82 244/6 |
| 3,332,643 A | * | 7/1967 | Toner | B64C 27/82 416/123 |
| 3,583,659 A | * | 6/1971 | Lermusiaux | B64C 27/82 416/247 R |
| 4,768,737 A | * | 9/1988 | Broadley | B64C 27/82 244/6 |
| 4,809,931 A | | 3/1989 | Mouille et al. | |
| 4,982,914 A | * | 1/1991 | Eickmann | B64C 11/28 244/54 |
| 5,251,847 A | * | 10/1993 | Guimbal | B64C 27/82 244/17.19 |

(Continued)

FOREIGN PATENT DOCUMENTS

| | | |
|---|---|---|
| EP | 3878738 A1 | 9/2021 |
| JP | H10100998 A | 4/1998 |
| WO | 2020250010 A1 | 12/2020 |

OTHER PUBLICATIONS

English Translation of EP-3878738A1.
English Translation of JP-H10100998A.

*Primary Examiner* — Hoi C Lau
(74) *Attorney, Agent, or Firm* — Akona IP PC

(57) ABSTRACT

One embodiment is a rotorcraft comprising a fuselage; an empennage at an aft end of the fuselage; a tail rotor connected to the empennage; and a tail rotor guard (TRG) around the tail rotor, the TRG shrouding to the tail rotor; and a light emitting diode (LED) lighting element integrated into at least one surface of the TRG.

10 Claims, 11 Drawing Sheets

(56) References Cited

U.S. PATENT DOCUMENTS

| | | | |
|---|---|---|---|
| 5,381,312 A * | 1/1995 | Authier | B64D 47/02 |
| | | | 362/470 |
| 5,738,301 A * | 4/1998 | Francois | B64C 27/26 |
| | | | 244/17.19 |
| 7,438,259 B1 * | 10/2008 | Piasecki | B64C 27/26 |
| | | | 244/175 |
| 7,959,105 B2 * | 6/2011 | Marze | B64C 11/001 |
| | | | 244/17.19 |
| 8,109,802 B2 * | 2/2012 | Chui | A63H 27/12 |
| | | | 446/36 |
| D712,310 S | 9/2014 | Gundlach et al. | |
| D713,321 S * | 9/2014 | Cummings | D12/326 |
| 8,985,500 B2 | 3/2015 | Borie et al. | |
| D894,814 S * | 9/2020 | Kooiman | D12/327 |
| D896,730 S * | 9/2020 | Kooiman | D12/319 |
| D899,344 S | 10/2020 | Voloscsuk | |
| 10,953,982 B2 * | 3/2021 | Moffitt | B64C 27/32 |
| 11,052,999 B2 | 7/2021 | Ross et al. | |
| 11,267,579 B2 * | 3/2022 | Ross | B64D 27/02 |
| 11,655,021 B2 * | 5/2023 | Pfaller | B64C 27/82 |
| | | | 244/17.19 |
| 11,697,493 B2 * | 7/2023 | Pfaller | B64C 27/06 |
| | | | 244/17.19 |
| 11,993,391 B1 * | 5/2024 | Piasecki | B64D 37/30 |
| 12,037,110 B2 * | 7/2024 | Pfaller | B64C 27/16 |
| 12,084,183 B2 * | 9/2024 | Pfaller | B64C 39/029 |
| 2008/0272244 A1 * | 11/2008 | Bjornenak | B64C 27/30 |
| | | | 244/7 R |
| 2009/0277991 A1 * | 11/2009 | Mikulla | B64C 27/82 |
| | | | 244/17.21 |
| 2011/0065351 A1 * | 3/2011 | Corsiglia | A63H 33/003 |
| | | | 446/454 |
| 2011/0178711 A1 * | 7/2011 | Christoph | G01S 7/51 |
| | | | 701/301 |
| 2014/0062755 A1 * | 3/2014 | Kabrt | G01S 7/003 |
| | | | 342/29 |
| 2015/0307190 A1 * | 10/2015 | Probst | B32B 38/0012 |
| | | | 156/92 |
| 2015/0360794 A1 * | 12/2015 | Certain | G01P 5/00 |
| | | | 701/14 |
| 2016/0251080 A1 * | 9/2016 | Wehle | B64C 27/20 |
| | | | 244/17.21 |
| 2016/0264240 A1 * | 9/2016 | Stucki | B64C 27/82 |
| 2018/0000062 A1 * | 1/2018 | Khawam | A01M 29/10 |
| 2018/0002034 A1 * | 1/2018 | Khawam | A01M 29/10 |
| 2018/0362190 A1 | 12/2018 | Chambers et al. | |
| 2019/0241278 A1 * | 8/2019 | Khawam | B64D 47/06 |
| 2019/0308722 A1 * | 10/2019 | Hampton | B64C 27/06 |
| 2020/0023958 A1 * | 1/2020 | Acee | B64C 27/357 |
| 2020/0198781 A1 * | 6/2020 | Haldeman | B64C 27/82 |
| 2020/0277049 A1 * | 9/2020 | Kooiman | B64C 27/82 |
| 2020/0297119 A1 * | 9/2020 | Nelson | B60Q 3/233 |
| 2020/0331600 A1 * | 10/2020 | McNulty | B64C 27/82 |
| 2020/0339252 A1 * | 10/2020 | Choi | B64C 27/82 |
| 2020/0407060 A1 * | 12/2020 | Hosseini | B64D 27/24 |
| 2021/0030784 A1 * | 2/2021 | George | B64C 27/82 |
| 2021/0053672 A1 * | 2/2021 | Villabrille Prades | B64U 70/83 |
| 2021/0207780 A1 * | 7/2021 | Rutherford | F21S 4/22 |
| 2021/0262630 A1 * | 8/2021 | Jha | F21S 41/28 |
| 2021/0284333 A1 * | 9/2021 | Windisch | B64C 29/0066 |
| 2021/0339875 A1 * | 11/2021 | Harms | B63B 22/04 |
| 2022/0169376 A1 * | 6/2022 | Dugré | B64C 27/82 |
| 2022/0169377 A1 * | 6/2022 | Bustamante | B64C 27/06 |
| 2023/0360536 A1 * | 11/2023 | Breuer | G08G 5/20 |
| 2024/0034464 A1 * | 2/2024 | Chapdelaine | B64C 27/82 |
| 2024/0239512 A1 * | 7/2024 | Heckl | B64C 27/82 |

* cited by examiner

LED TAIL ROTOR SAFETY AND STATUS INDICATION LIGHTING SYSTEM

CROSS-REFERENCE TO RELATED APPLICATION

This application is a continuation-in-part and claims the benefit of priority under 35 U.S.C. § 120 of U.S. patent application Ser. No. 17/873,983, filed on Jul. 26, 2022, entitled "PROTECTIVE SHROUD FOR AIRCRAFT TAIL ROTOR." The disclosure of the prior application is considered part of and is incorporated by reference in its entirety into the present disclosure.

TECHNICAL FIELD

This disclosure relates in general to the field of aircraft and, more particularly, though not exclusively, to a light emitting diode (LED) tail rotor safety and signature lighting system for such aircraft.

BACKGROUND

Certain rotorcraft, such as helicopters, may be provided with a tail rotor system for providing anti-torque and/or directional control for the rotorcraft. Such tail rotor systems may often include an open tail rotor, which may be considered a safety hazard to aircraft ground personnel and passengers in the vicinity of the tail rotor. A number of alternatives to an open rotor system have been proposed to provide anti-torque features for rotorcraft; however, such alternatives are typically significantly heavier and perform less effectively than a conventional open rotor anti-torque system.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
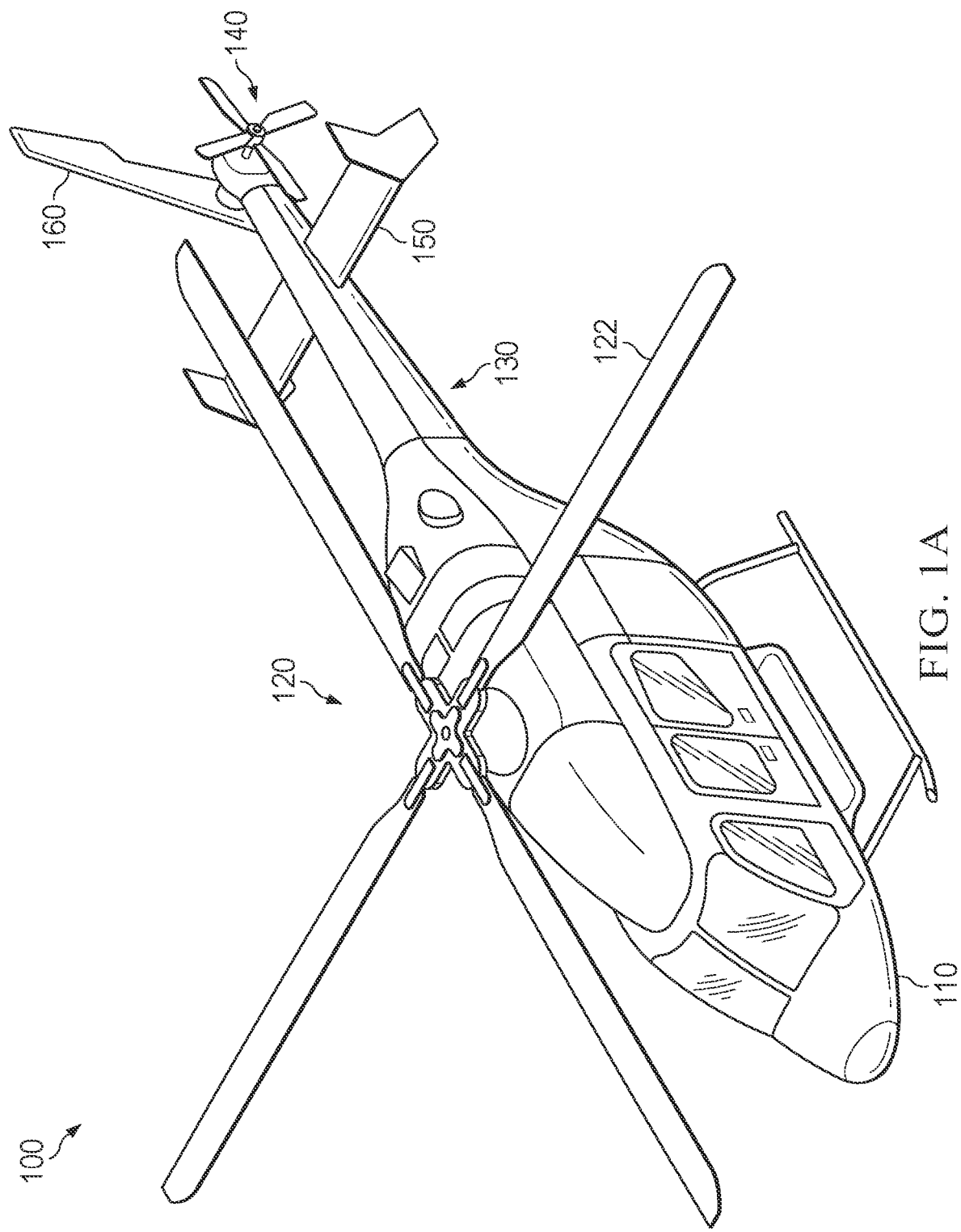
FIGS. 1A-1C illustrate a rotorcraft in which embodiments described herein may be implemented.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward," "aft," "inboard," and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Figure 1B:
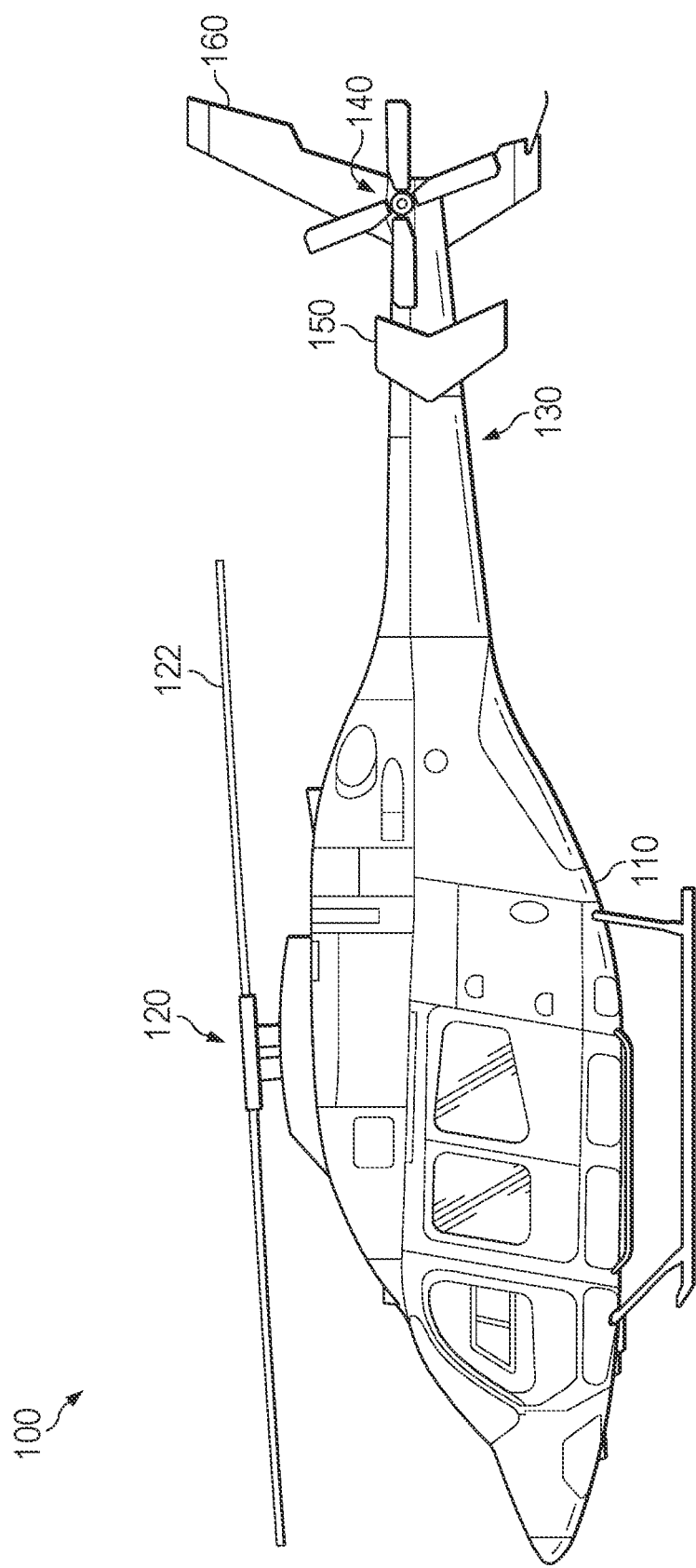
Figure 1C:
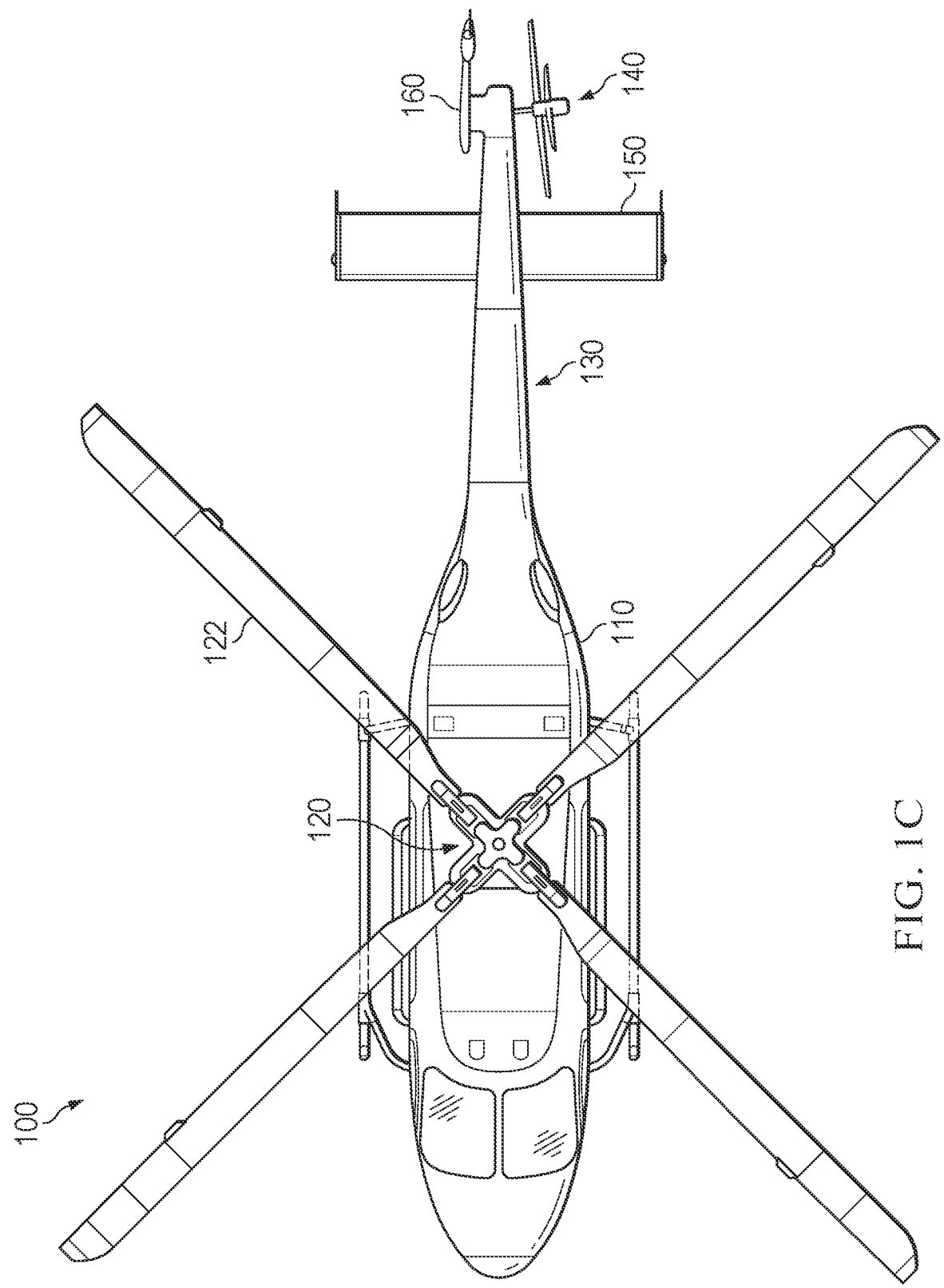

FIGS. 1A-1C illustrate various views of an example embodiment of a rotorcraft 100. Rotorcraft 100 includes a fuselage 110, a rotor system 120, and an empennage 130. The fuselage 110 is the main body of the rotorcraft, which may include a cabin for the crew, passengers, and/or cargo, and may also house certain mechanical and electrical components, such as the engine(s), transmission, and flight controls. The rotor system 120 is used to generate lift for the rotorcraft using a plurality of rotating rotor blades 122. For example, torque generated by the engine(s) causes the rotor blades 122 to rotate, which in turn generates lift. Moreover, the pitch of each rotor blade 122 can be adjusted in order to selectively control direction, thrust, and lift for the rotorcraft 100. The empennage 130 is the tail assembly of the rotorcraft. In the illustrated embodiment, the empennage 130 includes a tail rotor system 140, which may be used to provide anti-torque and/or directional control.

In the illustrated embodiment, the empennage 130 also includes a horizontal stabilizer 150 and a vertical stabilizer 160. In general, a stabilizer is an aerodynamic surface or airfoil that produces an aerodynamic lifting force (either positive or negative). For example, a stabilizer may be a fixed or adjustable structure with an airfoil shape, and may also include one or more movable control surfaces. The primary purpose of a stabilizer is to improve stability about a particular axis (e.g., pitch or yaw stability), although a stabilizer can also provide other secondary aerodynamic benefits.

A horizontal stabilizer (e.g., horizontal stabilizer 150) is primarily used to provide stability in pitch, or longitudinal stability. For example, both the rotor and fuselage of a rotorcraft typically have an inherent negative stability derivative in pitch, and accordingly, a horizontal stabilizer may be used to neutralize pitch instability and improve the overall handling qualities of the rotorcraft. A horizontal stabilizer may also be used to generate lift for a rotorcraft, for example, to aid in climb or ascent. In some cases, a horizontal stabilizer may also include one or more movable control surfaces, such as an adjustable slat to aid in generating lift. The design of a horizontal stabilizer (e.g., airfoil shape, size, position on a rotorcraft, control surfaces) implicates numerous performance considerations and is often an extremely challenging aspect of aircraft design.

A vertical stabilizer (e.g., vertical stabilizer 160) is primarily used to provide stability in yaw, or directional stability. Although considerable yaw stability and control is often provided by a tail rotor, a vertical stabilizer may be used to supplement the performance of the tail rotor and/or reduce the performance requirements of the tail rotor. Accordingly, designing a vertical stabilizer and a tail rotor often implicates numerous interrelated performance considerations, particularly due to the interaction between their respective airflows. For example, a smaller vertical stabilizer may reduce the adverse effects on tail rotor efficiency, but may adversely impact yaw stability and other design requirements (e.g., sideward flight performance, internal capacity for housing components within the vertical stabilizer). Accordingly, various performance considerations must be carefully balanced when designing a vertical stabilizer.

It will be recognized that various embodiments of horizontal and vertical stabilizers with designs that balance a variety of performance considerations to provide optimal performance may be provided. For example, certain embodiments of a horizontal stabilizer may be designed to provide strong aerodynamic performance (e.g., pitch stability and/or generating sufficient lift during climb or ascent) without using slats. Such a horizontal stabilizer may use a tailored airfoil design that is cambered and may form a concave slope on the top surface and/or a convex slope on the bottom surface. In some embodiments, the horizontal stabilizer may be mounted on the aft end of a rotorcraft. By obviating the need for slats, such a horizontal stabilizer design reduces complexity without a performance penalty, thus resulting in a more cost-efficient and reliable solution. Moreover, eliminating the slats similarly eliminates the need to provide anti-icing for the slats, thus providing a further reduction in complexity.

Moreover, certain embodiments of a vertical stabilizer may be designed to provide strong aerodynamic performance. Such a vertical stabilizer may use a tailored airfoil design that satisfies various design criteria, including strong aerodynamic performance (e.g., yaw stability, anti-torque control, minimal flow separation and drag). In some embodiments, for example, the vertical stabilizer may have a cambered airfoil shape that provides the requisite yaw stability and anti-torque control while also minimizing flow separation and drag. The cambered airfoil shape, for example, may enable the vertical stabilizer to provide a portion of the anti-torque required in forward flight (e.g., reducing the anti-torque requirements and power consumption of the tail rotor), and/or may also provide sufficient anti-torque to allow continued flight in the event of a tail rotor failure. The cambered airfoil shape may also enable the vertical stabilizer to provide sufficient aerodynamic sideforce to offset the tail rotor thrust in forward flight, thus minimizing tail rotor flapping and cyclic loads and maximizing the fatigue life of components. Moreover, in some embodiments, the vertical stabilizer may have a blunt trailing edge (rather than a pointed trailing edge) in order to reduce the thickness tapering on the aft end without modifying the desired chord length, thus minimizing flow separation and drag while also reducing manufacturing complexity.

It should be appreciated that rotorcraft 100 of FIGS. 1A-1C is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples.

As described above, helicopters require horizontal and vertical stabilization during forward flight. In accordance with features of embodiments described herein, portions of horizontals and vertical stabilization structures (such as horizontal stabilizers 150 and vertical stabilizers 160) may be combined into a structure referred to herein as an inverted V-tail (which, as used herein, includes a pair of inverted V-tail stabilizers comprising airfoils) that may perform certain aspects of both horizontal and vertical stabilization. In accordance with features of embodiments described herein, a conventional tail rotor for a rotorcraft may be provided with a safety structure, such as a TRG, surrounding the tail rotor, which TRG may be integrated with one or more inverted V-tails.

Figure 2A:
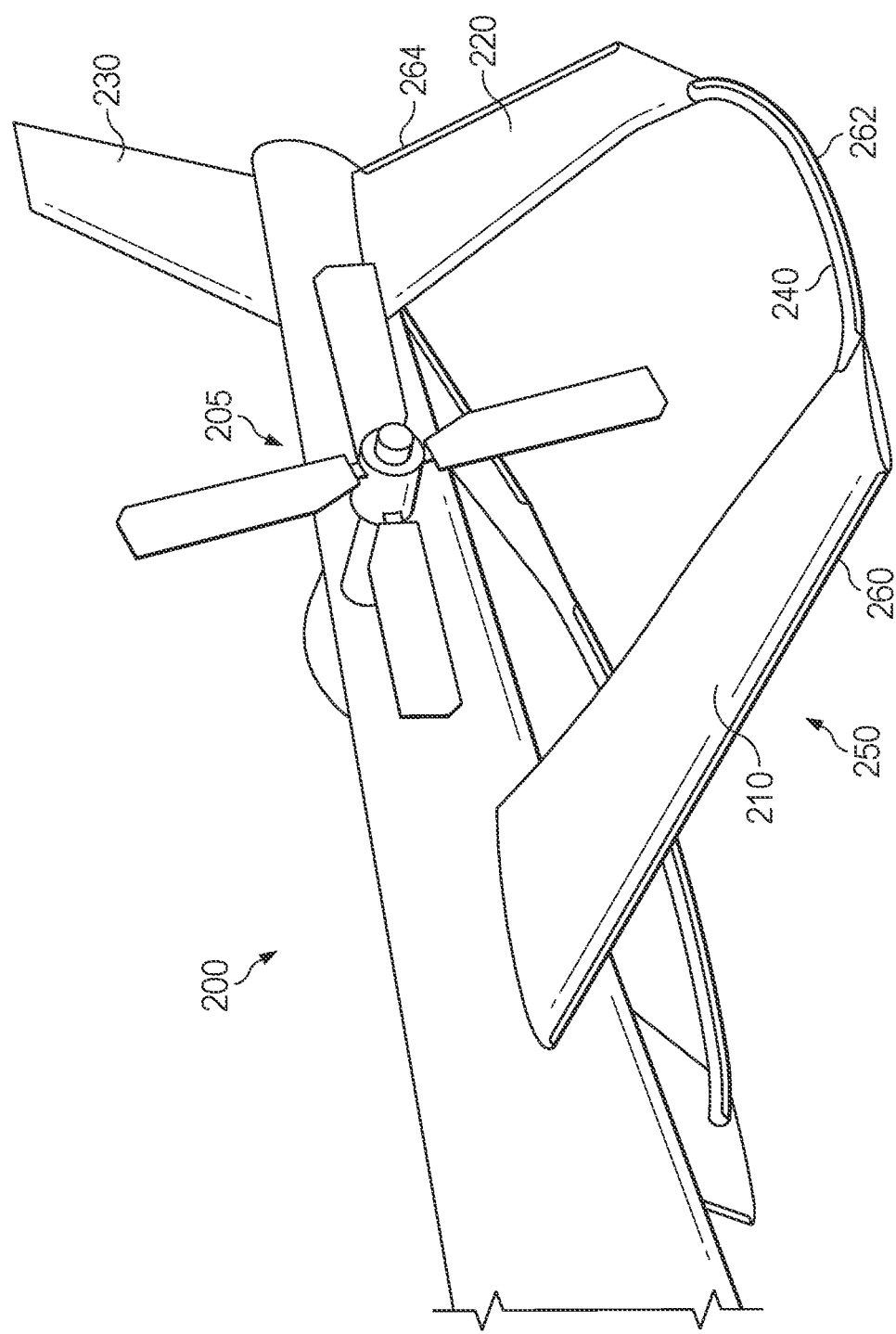
FIGS. 2A and 2B respectively illustrate a perspective view and a top plan view of a portion of an aircraft empennage including a tail rotor guard (TRG) having integrated LED lighting elements in accordance with features of embodiments described herein.
Figure 2B:
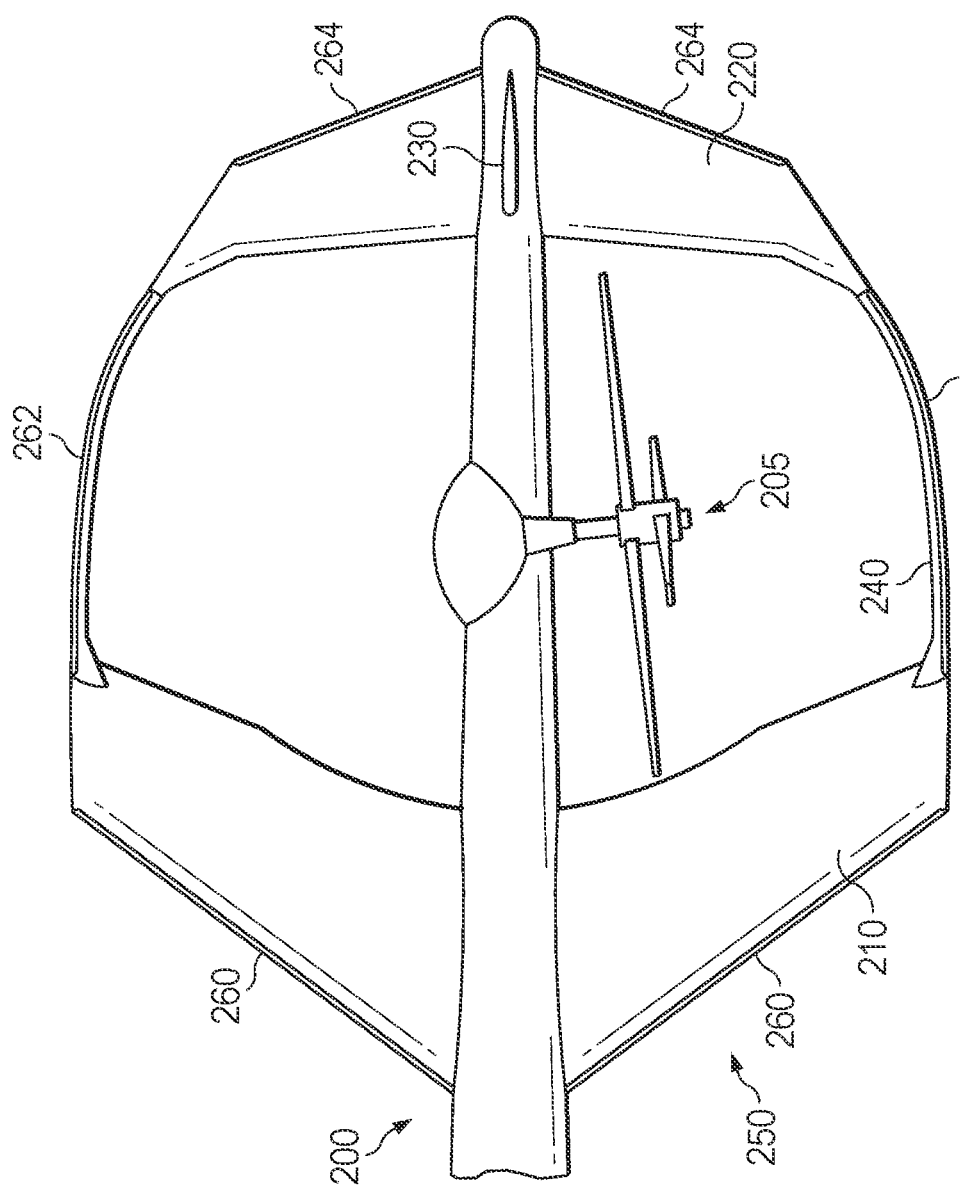

FIGS. 2A and 2B respectively illustrate a perspective view from the port side and a top plan view of a portion of an aircraft empennage 200 including features of embodiments described herein. As shown in FIGS. 2A and 2B, connected to the empennage 200 is a tail rotor 205, a forward inverted V-tail stabilizer 210 disposed forward of the tail rotor and an aft inverted V-tail stabilizer 220 disposed aft of the tail rotor. In the illustrated embodiment, a vertical stabilizer 230 may also be connected to a top aft end of the empennage 200. A shroud bar 240 extends between the forward inverted V-tail stabilizer 210 and the aft inverted V-tail stabilizer 220 such that the forward end of the shroud bar is connected to the outboard end of the forward inverted V-tail stabilizer 210 and the aft end of the shroud bar is connected to the outboard end of the aft inverted V-tail stabilizer 220. The combination of the inverted V-tail stabilizers 210, 220, and the shroud bar 240 comprise a TRG 250 that surrounds the tail rotor and provides a barrier. Although not labeled with reference numerals, a similar TRG structure is similarly connected to the opposite side of the empennage 200 (i.e., the side of the empennage opposite the side to which the tail rotor 205 is connected).

In the illustrated embodiment, the inverted V-tail stabilizers 210, 220, extend downward from the empennage 200 at an angle such that the shroud bar 240 is at an appropriate height to protect aircraft ground personnel, passengers, and/or other individuals, as described in greater detail below. In the illustrated embodiment, the shroud bar 240 extends below the tail rotor 205 to provide ground strike protection. As best illustrated in FIG. 2B, in the example embodiment, the inverted V-tails including the inverted V-tail stabilizers 210, 220, may be generally symmetrical (i.e., similar or identical on both port and starboard sides of the empennage 200) to provide balanced ground strike protection. In alternative embodiments, as will be described below, the inverted V-tails may be asymmetrical.

The angle and size (e.g., length and width) of the inverted V-tail stabilizers 210, 220, can be tailored for different aircraft to optimize both the horizontal and vertical component of stabilization and height of the shroud bar 240 to optimize protection from the tail rotor 205.

It will be recognized that the vertical stabilizer 230 may be unnecessary depending on the vertical and horizontal stabilization provided by the inverted V-tail stabilizers 210, 220, but may be included for implementations in which more vertical stabilization is necessary. It will be recognized that the specific physical and aerodynamic characteristics of the inverted V-tails comprising the inverted V-tail stabilizers 210, 220, may be dictated by physical, aerodynamic, and other characteristics of the aircraft for which they are designed to be used.

In accordance with features of embodiments described herein, LED lighting elements, such as LED light tubes or LED light strips, for example, may be integrated into leading edges, side edges, and/or trailing edges of the TRG of an aircraft to provide crew and passengers a clear visual line-of-sight indicator of where the tail rotor is located and where the physical safety margin is located with respect to the tail rotor. Additionally and/or alternatively, the LED lighting elements integrated into the TRG may employ different light states on different portions of the TRG, for example, to indicate and/or communicate a status of the aircraft, such as in-flight, landing, taking off, and experiencing an emergency. Light states may include color, brightness or intensity, and steady state or flashing. Moreover, the frequency of the flashing and whether or not various LED lighting elements disposed on the TRG are flashing synchronously or asynchronously with one another may constitute additional light states that may be indicative of a current status of the aircraft. It will be recognized that different LED lighting elements may have different states at a particular point in time and that the combination of states of the LED lighting elements may correspond to and be indicative of a particular status of the aircraft at that point in time.

For example, a first combination of light states may indicate that an aircraft is getting 1 ready to land, a second combination of light states may indicate that an aircraft is experiencing an in-air emergency, a third combination of lights states may indicate that an aircraft is getting ready to takeoff, and a fourth combination of light states may indicate that an aircraft is operating normally. Still further, a combination of light states may serve as a signature indicative of an identity or manufacturer of the aircraft.

Referring to FIGS. 2A-2B, in the illustrated embodiment, LED lighting elements 260, 262, 264, are provided on the leading edge, side edge, and trailing edge, respectively, of the TRG 250. LED lighting elements 260, 262, 264, operate as described above to indicate a status of the aircraft. It will be recognized that, although LED lighting elements are shown as being integrated into each of leading, side, and trailing edges of the TRG 250, it is possible that one or more of the LED lighting elements 260, 262, 264, may be omitted without departing from the spirit or scope of embodiments described herein. Additionally, one or more of the LED lighting elements 260, 262, 264, may be combined with another one of the LED lighting elements and/or may be implemented as multiple discrete segments integrated into the corresponding edge of the TRG 250.

Figure 3A:
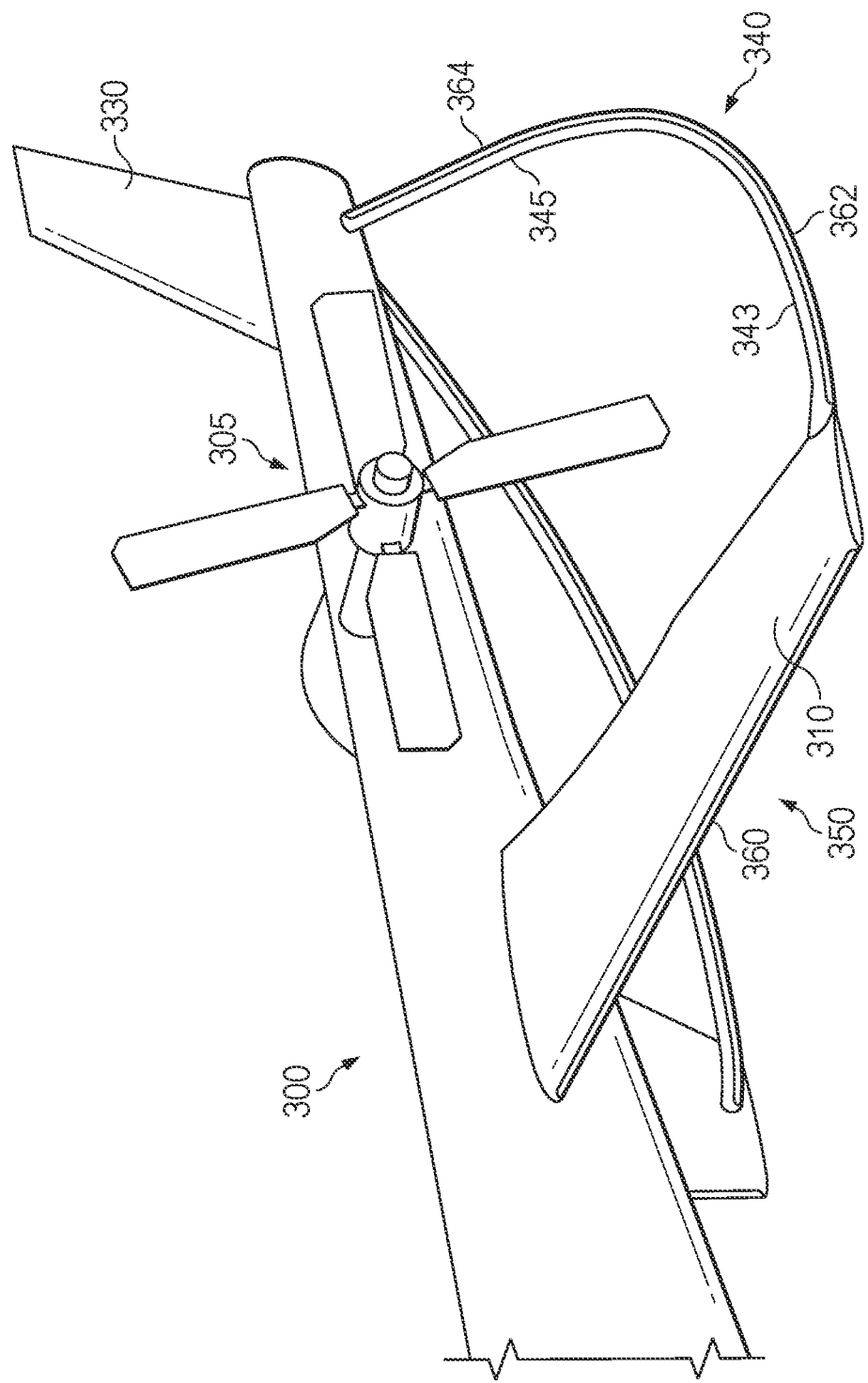
FIGS. 3A and 3B respectively illustrate a perspective view and a top plan view of an alternative embodiment of an aircraft empennage including a TRG having integrated LED lighting elements in accordance with features of embodiments described herein.
Figure 3B:
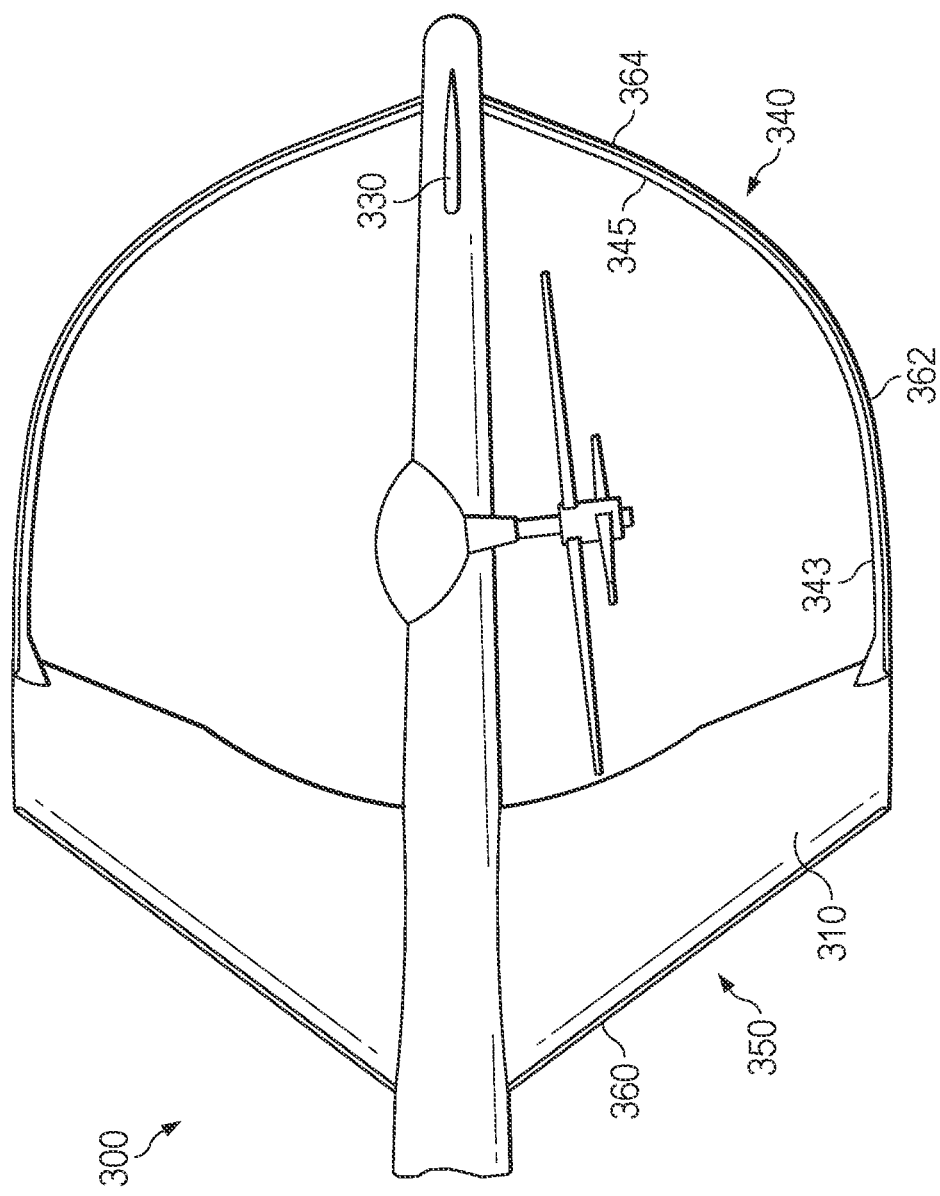

FIGS. 3A and 3B respectively illustrate a perspective view from the port side and a top plan view of an alternative embodiment of an aircraft empennage 300 which is similar to the empennage 200 (FIGS. 2A and 2B) in that it has connected thereto a tail rotor 305, a forward inverted V-tail stabilizer 310 disposed forward of the tail rotor, an optional vertical stabilizer 330, and a shroud bar 340; however, in the embodiment illustrated in FIGS. 3A and 3B, the shroud bar 340 includes a horizontal portion 343 and a vertical portion 345. A first end of the shroud bar 340 comprising the horizontal portion 343 is connected to an outboard end of the forward inverted V-tail stabilizer 310 and a second end of the shroud bar comprising the vertical portion 345 of the shroud bar is connected directly to the corresponding side of the body of the empennage 300 proximate an aft end thereof (e.g., below the vertical stabilizer 330). In contrast to the embodiment illustrated in FIGS. 2A and 2B, the embodiment illustrated in FIGS. 3A and 3B lacks an aft inverted V-tail stabilizer. The combination of the inverted V-tail stabilizer 310 and the shroud bar 340 comprise a TRG 350. Although not labeled with reference numerals, a similar TRG structure is similarly connected to the opposite side of the empennage 300 (i.e., the side of the empennage opposite the side to which the tail rotor 305 is connected).

In accordance with features of embodiments described herein, the inverted V-tail stabilizer 310 extends downward from the empennage 300 at an angle such that the horizontal portion 343 of the shroud bar 340 is at an appropriate height to protect aircraft ground personnel, passengers, and/or other individuals. In the illustrated embodiment, the shroud bar 340 extends below the tail rotor 305 to provide ground strike protection. As best illustrated in FIG. 3B, the inverted V-tail comprising the TRG structure is generally symmetrical (i.e., similar or identical on both port and starboard sides of the empennage 300) to provide balanced ground strike protection. In alternative embodiments, as will be described below, the inverted V-tail may be asymmetrical.

The angle and size of the inverted V-tail stabilizer 310 can be tailored for different aircraft to optimize both the horizontal and vertical component of stabilization and height of the shroud bar 340 to optimize protection from the tail rotor 305. It will be recognized that the vertical stabilizer 330 may be unnecessary depending on the vertical and horizontal stabilization provided by the inverted V-tail stabilizer 310 but may be included for implementations in which more vertical stabilization is necessary.

Referring to FIGS. 3A-3B, in the illustrated embodiment, LED lighting elements 360, 362, 364, are provided on the leading edge, side, and trailing edge, respectively, of the TRG 350. LED lighting elements 360, 362, 364, operate as described above to indicate a status of the aircraft. It will be recognized that, although LED lighting elements are shown as being integrated into each of leading, side, and trailing edges of the TRG 350, it is possible that one or more of the LED lighting elements 360, 362, 364, may be omitted without departing from the spirit or scope of embodiments described herein. Additionally, one or more of the LED lighting elements 360, 362, 364, may be combined with another one of the LED lighting elements and/or may be implemented as multiple discrete segments integrated into the corresponding edge of the TRG 350.

Figure 4A:
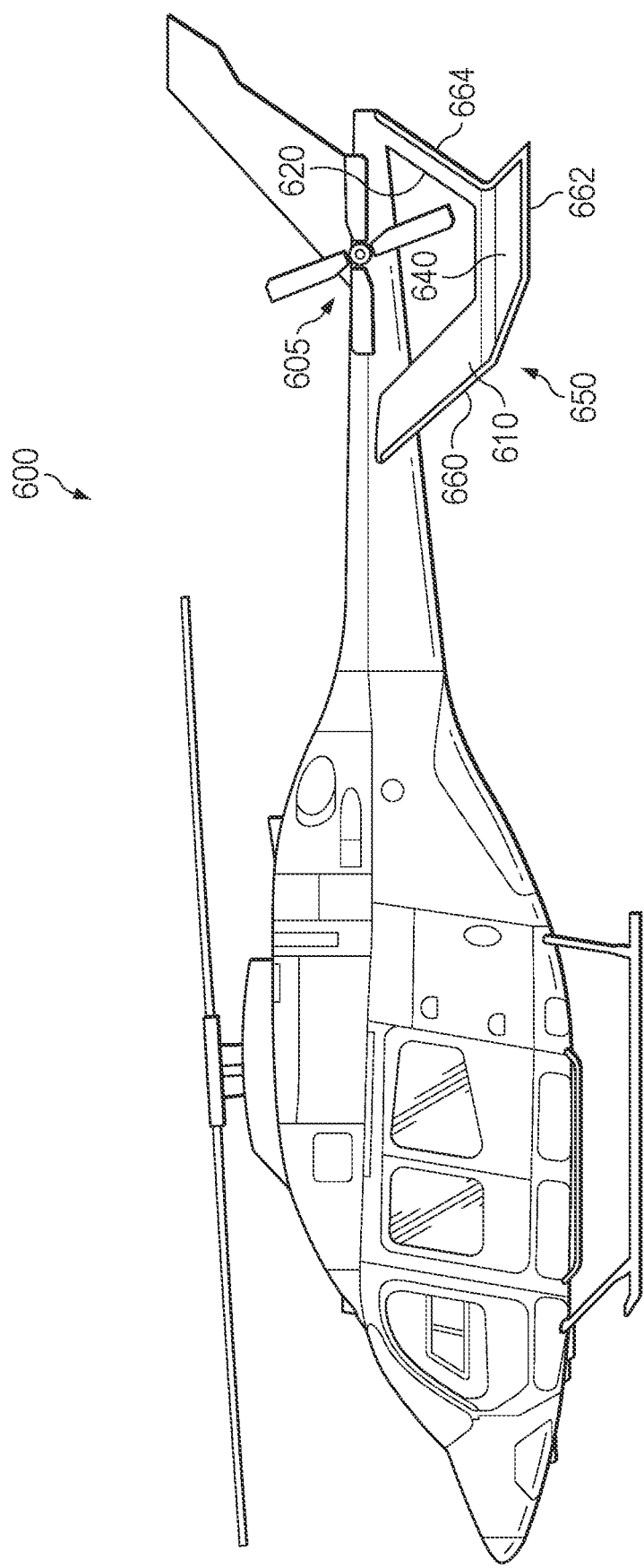
FIGS. 4A and 4B respectively illustrate a side plan view and a top plan view of an aircraft having a TRG having integrated LED lighting elements in accordance with features of embodiments described herein.
Figure 4B:
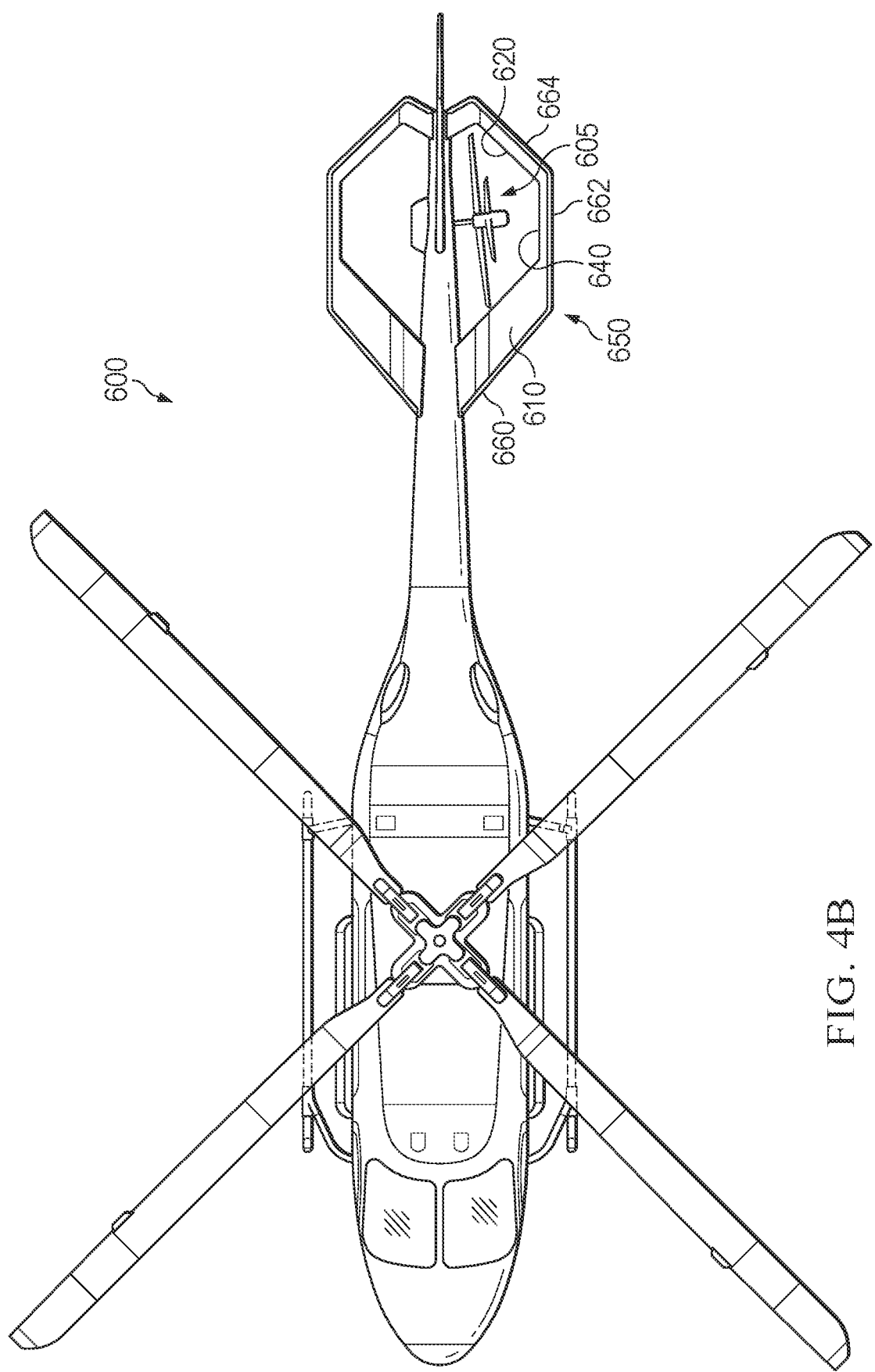

FIGS. 4A and 4B respectively illustrate a side plan view and a top plan view of an aircraft 600 including features of embodiments described herein. As shown in FIGS. 4A and 4B, the aircraft 600 includes a tail rotor 605, a forward inverted V-tail stabilizer 610 disposed forward of the tail rotor and an aft connector structure 620 disposed aft of the tail rotor. In the illustrated embodiment, a vertical stabilizer 630 may also be connected to a top aft end of the empennage of the aircraft 600. A shroud structure 640 extends between the forward inverted V-tail stabilizer 610 and the aft connector structure 620 such that the forward end of the shroud structure is connected to the outboard end of the forward inverted V-tail stabilizer 610 and the aft end of the shroud structure is connected to the outboard end of the aft connector structure 620. The combination of the inverted V-tail stabilizer 610, the aft connector structure 620, and the shroud structure 640 comprise a TRG 650. Although not labeled with reference numerals, a similar TRG structure is similarly connected to the opposite side of the empennage of the aircraft 600 (i.e., the side of the empennage opposite the side to which the tail rotor 605 is connected).

In accordance with features of embodiments described herein, the inverted V-tail stabilizer 610 and connector structure 620 extend downward from the empennage of the aircraft 600 at an angle such that the shroud structure 640 is at an appropriate height to protect aircraft ground personnel, passengers, and/or other individuals, as described in greater detail above. In the illustrated embodiment, the inverted V-tail including the inverted V-tail stabilizer 610, may be generally symmetrical (i.e., similar or identical on both port and starboard sides of the empennage of the aircraft 600). In alternative embodiments, the inverted V-tail may be asymmetrical.

In the embodiment illustrated in FIGS. 4A and 4B, LED lighting elements 660, 662, 664, are provided on the leading edge, side edge, and trailing edge, respectively, of the TRG 650. LED lighting elements 660, 662, 664, operate as described above to indicate a status of the aircraft. It will be recognized that, although LED lighting elements are shown as being integrated into each of leading, side, and trailing edges of the TRG 650, it is possible that one or more of the LED lighting elements 660, 662, 664, may be omitted without departing from the spirit or scope of embodiments described herein. Additionally, one or more of the LED lighting elements 660, 662, 664, may be combined with another one of the LED lighting elements and/or may be implemented as multiple discrete segments integrated into the corresponding edge of the TRG 650.

Figure 5A:
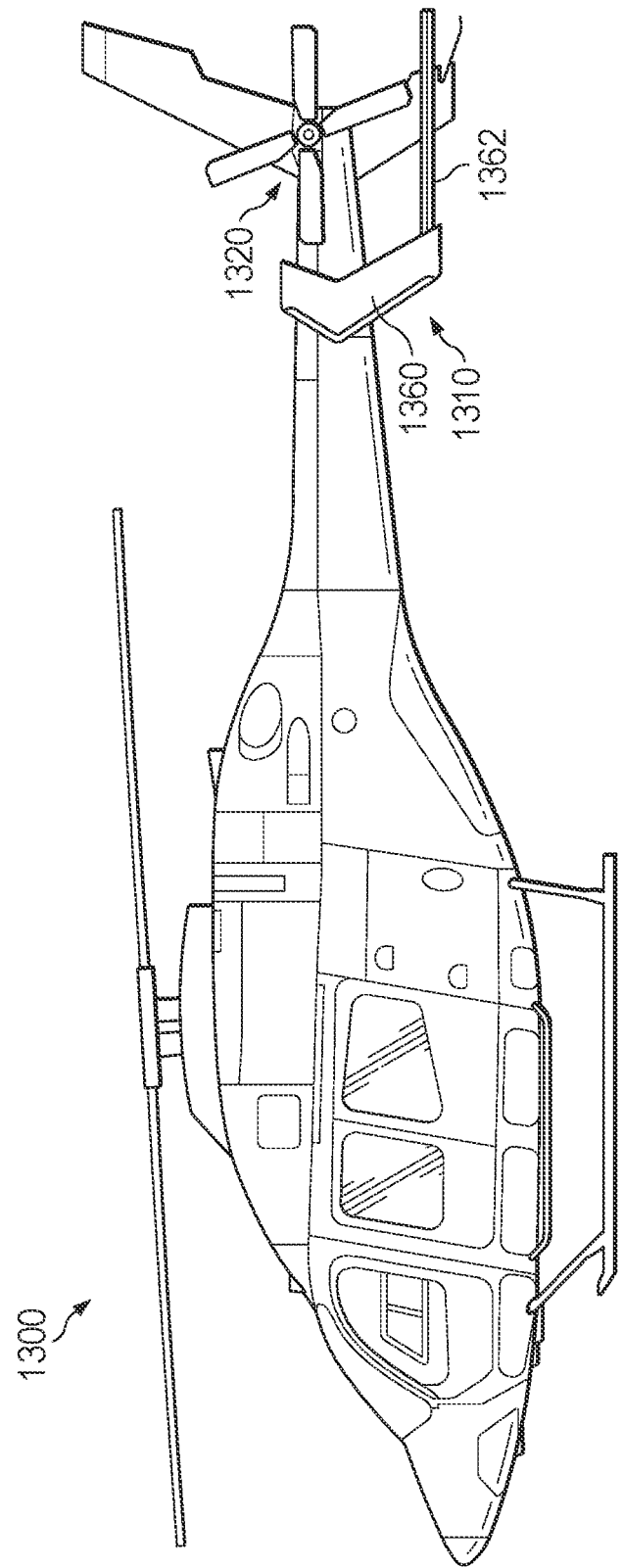
FIGS. 5A and 5B respectively illustrate a side plan view and a top plan view of an aircraft having a TRG having integrated LED lighting elements in accordance with features of embodiments described herein.
Figure 5B:
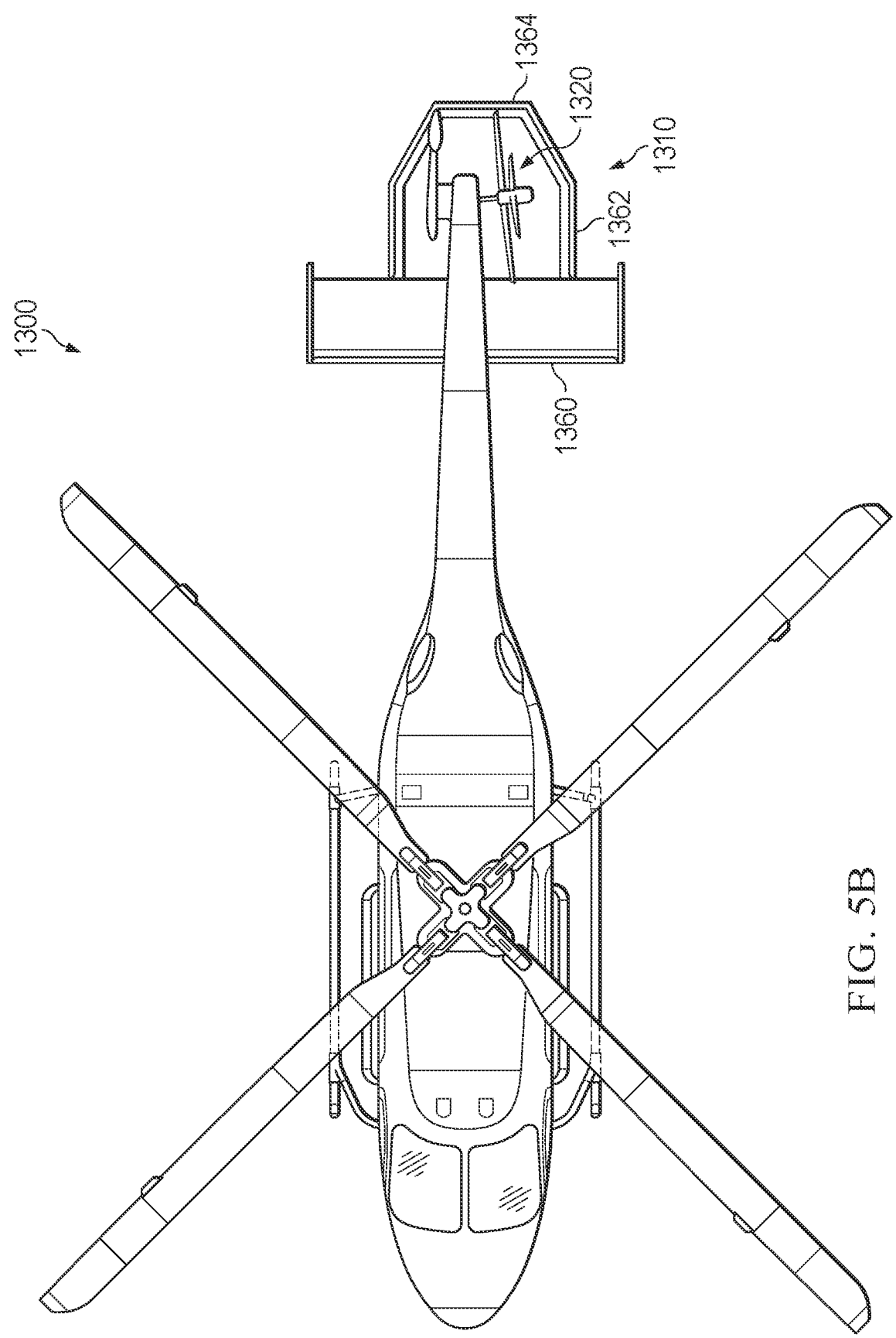

FIGS. 5A and 5B respectively illustrate a side plan view and a top plan view an aircraft 1300 including features of embodiments described herein. In particular, aircraft 1300 includes an alternative design for a TRG 1310 for preventing unintentional contact with a tail rotor 1320 in a manner similar to that described hereinabove.

In the embodiment illustrated in FIGS. 5A and 5B, LED lighting elements 1360, 1362, 1364, are provided on the leading edge, side edge, and trailing edge, respectively, of the TRG 1310. LED lighting elements 1360, 1362, 1364, operate as described above to indicate a status of the aircraft. It will be recognized that, although LED lighting elements are shown as being integrated into each of leading, side, and trailing edges of the TRG 1310, it is possible that one or more of the LED lighting elements 1360, 1362, 1364, may be omitted without departing from the spirit or scope of embodiments described herein. Additionally, one or more of the LED lighting elements 1360, 1362, 1364, may be combined with another one of the LED lighting elements and/or may be implemented as multiple discrete segments integrated into the corresponding edge of the TRG 1310.

It should be appreciated that the aircraft illustrated herein are merely illustrative of a variety of aircraft may benefit from implementation of TRGs as described herein, including TRGs having LED lighting integrated therein. Indeed, the various embodiments of TRGs herein may be used on any type of aircraft including an open tail rotor. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

Additionally, the integrated LED lighting described herein may be provided on other portions of aircraft in addition and/or alternatively to the leading, side, and trailing edges of a TRG. For example, the integrated LED lighting may be incorporated/integrated into leading, side, and/or trailing edges of other components and/or safety structures of an aircraft (which may be an aircraft other than a rotorcraft), such as a wing, a stabilizer, an empennage, and a fuselage, to name a few. Although embodiments are described herein in which the integrated LED lighting is provide on surfaces of the aircraft that are visible from the ground when the aircraft is in flight, it is anticipated that lights may be provided on other surfaces to provide information to pilots of other aircraft in flight, for example.

The components of rotor assemblies described herein may comprise any materials suitable for use with an aircraft rotor. For example, rotor blades and other components may comprise carbon fiber, fiberglass, or aluminum; and rotor masts and other components may comprise steel or titanium.

Example 1 provides a rotorcraft comprising a fuselage; an empennage at an aft end of the fuselage; a tail rotor connected to the empennage; a tail rotor guard (TRG) around the tail rotor, the TRG shrouding to the tail rotor; and a light emitting diode (LED) lighting element integrated into at least one surface of the TRG.

Example 2 provides the rotorcraft of example 1, wherein the at least one surface of the TRG comprises side edges of the TRG.

Example 3 provides the rotorcraft of example 1, wherein the at least one surface of the TRG comprises leading edges of the TRG.

Example 4 provides the rotorcraft of example 1, wherein the at least one surface of the TRG comprises trailing edges of the TRG.

Example 5 provides the rotorcraft of example 1, wherein the at least one surface of the TRG comprises one or more of a leading edge, a side edge, and a trailing edge of the TRG.

Example 6 provides the rotorcraft of example 1, wherein the LED lighting element comprises a plurality of LED lighting elements disposed on a single edge of the TRG.

Example 7 provides the rotorcraft of example 1, wherein the LED lighting element comprises an LED light tube.

Example 8 provides the rotorcraft of example 1, wherein the LED lighting element comprises an LED light strip.

Example 9 provides the rotorcraft of example 1, wherein a state of the LED lighting element indicates a status of the rotorcraft.

Example 10 provides the rotorcraft of example 9, wherein the state of the LED lighting element comprises at least one of a color of the LED lighting element, a frequency with which the LED lighting element flashes, a brilliance of the LED lighting element, and an intensity of the LED lighting element.

Example 11 provides the rotorcraft of example 10, wherein the LED lighting element comprises a plurality of LED lighting elements, and wherein each of the LED lighting elements is in a different state than the other ones of the LED lighting elements simultaneously and wherein the different states collectively indicate the status of the rotorcraft.

Example 12 provides an apparatus for indicating a status of an aircraft, the apparatus comprising a plurality of lighting elements integrated into at least one surface of the aircraft, wherein states of the lighting elements indicate a status of the aircraft.

Example 13 provides the apparatus of example 12, wherein the states of the lighting elements comprise at least one of a color of the lighting elements, a frequency with which the lighting elements flash, a brilliance of the lighting elements, and an intensity of the lighting elements.

Example 14 provides the apparatus of example 13, wherein each of the lighting elements is in a different one of the state than the other ones of the lighting elements simultaneously and wherein the different states collectively indicate the status of the aircraft.

Example 15 provides the apparatus of example 12, wherein the at least one surface of the aircraft comprises at least one of a leading edge, a side edge, and a trailing edge of a component of the aircraft.

Example 16 provides the apparatus of example 15, wherein the component of the aircraft comprises at least one of a wing, an empennage, a stabilizer, and a tail rotor guard (TRG).

Example 17 provides the apparatus of example 12 wherein a configuration of the plurality of lighting elements indicates an identity of the aircraft.

Example 18 provides an aircraft comprising a fuselage; a rotor; and a lighted safety structure for preventing unintentional access to the rotor, wherein the lighted safety structure comprises at least one light emitting diode (LED) lighting element integrated into at least one edge of the lighted safety structure.

Example 19 provides the aircraft of example 18, wherein a state of the at least one LED lighting element indicates a status of the aircraft.

Example 20 provides the aircraft of example 19, wherein the state of the at least one LED lighting element comprises at least one of a color of the at least one LED lighting element, a frequency with which the at least one LED lighting element flashes, a brilliance of the at least one LED lighting element, and an intensity of the at least one LED lighting element.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A rotorcraft comprising:
   a fuselage;
   an empennage at an aft end of the fuselage;
   a tail rotor connected to the empennage;
   a tail rotor guard (TRG) around the tail rotor, the TRG shrouding to the tail rotor; and
   a light emitting diode (LED) lighting element integrated into at least one surface of the TRG;
   wherein a state of the LED lighting element indicates a status of the rotorcraft.

2. The rotorcraft of claim 1, wherein the at least one surface of the TRG comprises side edges of the TRG.

3. The rotorcraft of claim 1, wherein the at least one surface of the TRG comprises leading edges of the TRG.

4. The rotorcraft of claim 1, wherein the at least one surface of the TRG comprises trailing edges of the TRG.

5. The rotorcraft of claim 1, wherein the at least one surface of the TRG comprises one or more of a leading edge, a side edge, and a trailing edge of the TRG.

6. The rotorcraft of claim 1, wherein the LED lighting element comprises a plurality of LED lighting elements disposed on a single edge of the TRG.

7. The rotorcraft of claim 1, wherein the LED lighting element comprises an LED light tube.

8. The rotorcraft of claim 1, wherein the LED lighting element comprises an LED light strip.

9. The rotorcraft of claim 1, wherein the state of the LED lighting element comprises at least one of a color of the LED lighting element, a frequency with which the LED lighting element flashes, a brilliance of the LED lighting element, and an intensity of the LED lighting element.

10. The rotorcraft of claim 1, wherein the LED lighting element comprises a plurality of LED lighting elements, and wherein each of the LED lighting elements is in a different state than the other ones of the LED lighting elements simultaneously and wherein the different states collectively indicate the status of the rotorcraft.

* * * * *